United States Patent Office 3,365,418
Patented Jan. 23, 1968

3,365,418
ELASTOMERIC COMPOSITIONS CONTAINING A CURE-PROMOTING COPOLYMER OF ETHYLENE AND 1,4-HEXADIENE
Jack Leland Nyce, Meadowood, and Anthony Laurence Shloss, Wilmington, Del., assignors to E. I. du Pont de Nemours and Company, Wilmington, Del., a corporation of Delaware
No Drawing. Filed Oct. 31, 1963, Ser. No. 320,552
12 Claims. (Cl. 260—41.5)

ABSTRACT OF THE DISCLOSURE

Preparation of a normally solid elastomeric copolymer composition from an α-olefin/non-conjugated hydrocarbon diene copolymer or butyl rubber, with 20 to 300 parts of filler and a sulfur curing system, into which is added a cure-promoting copolymer of ethylene and 1,4-hexadiene having from 3 to 10 gram moles of unsaturation per kilogram and displaying an inherent viscosity of at least 0.1.

---

This invention relates to sulfur-curable, filler-loaded elastomeric compositions. More particularly, it relates to sulfur-cured, filler-loaded elastomers and methods for their preparation.

Sulfur-curable α-olefin hydrocarbon copolymers are acquiring increasing importance today in the manufacture of a wide variety of useful products. For some applications, such as shoe soles and heels, it is desirable that a large proportion of a reinforcing kaolin clay filler be present along with the α-olefin copolymer. Although such compositions can be cured by numerous sulfur-curing systems, the vulcanizates obtained require a higher modulus and lower compression sets for the contemplated uses. For other applications, such as vent window seals and molded corners on windshield gaskets, it is desirable that a large proportion of a reinforcing carbon black be used to extend the α-olefin copolymer; however, the compression sets at 100° C. of the vulcanizates obtained with the usual sulfur curing systems have left something to be desired. Butyl rubber, likewise, is extended with clays and carbon blacks for many applications and it would be desirable that the vulcanizates obtained from these compositions display a smaller compression set and a higher modulus without the necessity for employing a heat-treatment prior to the curing process. It is known that improved results can be attained, to some extent, if these filled stocks are specially heat-treated prior to incorporation of the curing agent, and it has also been found that this heat-treatment is made more effective if certain promoters are present during the heat-treatment such as the dinitroso, dioxime, and aromatic quinoid compounds. It is, however, quite inconvenient and expensive to carry out the heat-treatment process. The extra time required to cool the heat-treated stocks before the curing agents can be added lowers the production rate.

It is, therefore, an object of the present invention to provide novel loaded hydrocarbon compositions displaying improved curability. It is a further object to provide novel sulfur-cured, filler-loaded α-olefin and butyl rubber copolymer compositions and methods for their preparation. Another object is to provide such compositions which display improved modulus and a lower compression set. Yet another object is to provide such compositions by a process which obviates the need for an intervening heat-treatment step. Other objects will appear hereinafter.

These and other objects are accomplished in accordance with this invention by a process for preparing a sulfur-cured, filler-loaded elastomeric composition which comprises mixing (I) a normally solid elastomeric copolymer selected from the group consisting of (a) a copolymer of at least one α-monoolefin and at least one non-conjugated hydrocarbon diene of from 5 to 22 carbon atoms, said copolymer having up to about 2 gram-moles of carbon-to-carbon double bonds per kilogram, and (b) a copolymer of an isoolefin and a conjugated diene, said isoolefin and diene having from 4 to 14 carbon atoms, and said copolymer having an iodine number of from 1 to about 50; (II) from about 20 to 300 parts of a filler compound per 100 parts of copolymer (I), (III) at least 1 part, per 100 parts of copolymer (I), of a cure-promoting copolymer of ethylene and 1,4-hexadiene having from about 3 to 10 gram-moles of carbon-to-carbon double bonds per kilogram and displaying an inherent viscosity (measured on an 0.1% by weight solution in tetrachloroethylene at 30° C.) of at least 0.1; and (IV) a sulfur-curing system in amounts containing sufficient sulfur to react with said copolymers and said promoter compound; and heating the mixture to effect a cure.

(I) The principal elastomer (a) The principal elastomer can be a normally solid elastomeric copolymer of at least one α-monoolefin and at least one non-conjugated hydrocarbon diene.

The α-monoolefins have the structure R—CH=CH₂, wherein R is H or $C_1$-$C_{16}$ alkyl. Representative examples of useful α-monoolefins include: propylene; 1-butene; 4-methyl-1-pentene; 1-pentene; 1-hexene; 1-heptene; 1-octene; 1-decene; 5-methyl-1-nonene; 5,5-dimethyl-1-octene; 4-methyl-1-hexene; 4,4-dimethyl-1-pentene; 5-methyl-1-hexene; 4-methyl-1-heptene; 5-methyl-1-heptene; 4,4-dimethyl-1-hexene; 5,6,6-trimethyl-1-heptene; 1-dodecene; and 1-octadecene. The straight-chain olefins are preferred.

Representative dienes include open-chain compounds of the formula

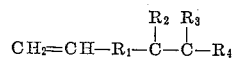

wherein $R_1$ is an alkylene radical, $R_2$ and $R_3$ are independently selected from the group consisting of hydrogen and alkyl radicals and $R_4$ is an alkyl radical and wherein $R_1$ to $R_4$ are so selected that the diene has from about 6 to 22 carbon atoms. Examples of these dienes include: 1,4-hexadiene; 1,9-octadecadiene; 6-methyl-1,5-heptadiene; 7-methyl-1,6-octadiene; 11-ethyl-1,11-tridecadiene; 9-ethyl-1,9-undecadiene; 7-ethyl-1,7-nonadiene; 8-propyl-1,8-undecadiene; 8-ethyl-1,8-decadiene; 10-ethyl-1,9-dodecadiene; 12-ethyl-1,12-tetradecadiene; 13-n-butyl-1,12-heptadecadiene; and 15-ethyl-1,15-heptadecadiene. Open-chain dienes having two terminal non-conjugated carbon-to-carbon double bonds, e.g., 1,5-hexadiene or 1,4-pentadiene can be used but are less preferred. Representative cyclic nonconjugated dienes include: dicyclopentadiene; 5-alkenyl-substituted-2-norbornene; 5-methylene-2-norbornene; 2-alkyl-2,5-norbornadienes, cyclopentadiene; 1,5-cyclooctadiene.

Representative examples of copolymers made from these α-monoolefins and the above-described non-conjugated dienes and their preparation are described in U.S. Patents 2,933,480; 3,000,866; 3,063,973; 3,093,620, and 3,093,621 and in French Patents 1,285,090 and 1,302,690. Particularly preferred are copolymers of from about 30 to 70 weight percent ethylene, 30 to 70 weight percent propylene and up to about 10 weight percent 1,4-hexadiene or dicyclopentadiene. As previously stated, these copolymers have up to about 2 gram-moles of carbon-to-carbon double bonds per kilogram.

These a-olefin copolymers can be oil extended before they are cured by the present invention. Copolymers having Mooney (ML–4/100° C.) viscosities of at least 50, preferably higher, and inherent viscositiees of 1.8 or above (measured on a 0.1% by weight solution in tetrachloroethylene at 30° C.) have been found to be suitable. The oils used are petroleum oils having a flash point of at least about 300° F. and a viscosity-gravity constant in the range of from 0.80 to 1.0, preferably 0.80 to 0.90. The particularly preferred oils have a total nitrogen base and first acidaffin content of not greater than 15% by weight as determined by the Rostler method, described in Industrial and Engineering Chemistry, vol. 41, pages 598 to 608, March, 1949. The viscosity-gravity constant is described in the 1958 booklet "A Graphic Method for Selecting Oils Used in Compounding and Extending Butadiene-Styrene Rubbers" (Industrial Products Department, Sun Oil Company, Philadelphia, Pennsylvania, 1958). Representative oils include paraffinic oils, naphthenic, relatively aromatic, and aromatic oils. The petroleum oil can be introduced into the copolymer any time after the polymerization reaction is finished. The petroleum oil can be added to the solution, the resulting mixture obtained being pumped to a drum dryer to remove the solvent. Alternatively, the petroleum oil can be introduced at the nip of the drum dryer along with the polymer solution. If desired, petroleum oil can be introduced into the dried copolymer stock in a Banbury mixer or on a rubber roll mill. A good dispersion can readily be obtained by empirical experimentation by those skilled in the art. A detailed view of the major petroleum oils is given in the article entitled "Hydrocarbon Composition of Rubber Process Oils" by S. Kurtz, Jr. and C. C. Martin, India Rubber World Co., 126, No. 4, July 1952, page 495 onward.

(b) Butyl-type rubbers suitable for use as the principal elastomer (I) in the present invention and closely related isoolefin copolymer compositions are more particularly described in U.S. Patent 2,822,342. The isoolefin has 4 to 14 carbon atoms inclusive; the preferred isoolefin is isobutylene. The multi-olefin has from 4 to 14 carbon atoms inclusive per molecule and is preferably a conjugated diolefin having from 4 to 8 carbon atoms per molecule such as isoprene, butadiene and the like. The preferred copolymers made from isobutylene have an average Staudinger molecular weight number within the range betwen 20,000 and 200,000 and a Wijs iodine number of from about 1 up to 50. The correspondingly related 8-minute Mooney viscosity values of these copolymers is at least 15. The particularly preferred copolymer contains 95–99.5% of isobutylene monomer units and 5 to 0.5% of isoprene monomer units by weight, and has the molecular weights and iodine numbers specified above. The preparation of these copolymers is described in greater detail on lines 13 to 75 of column 4 and lines 1 through 75 of column 5 of U.S. Patent 2,822,342.

(II) *The filler compound*

The filler compound of the present invention can be a mineral filler, carbon black or mixtures thereof; representative examples include: calcined kaolin clay, blanc fixe, titanium dioxide, magnesium silicate, esterified silica, fine particle talc, whiting and preferably a kaolin clay or carbon black. Any kaolin clay which is conventionally used for reinforcing elastomers can be employed to make the mixture of the present invention. In general, these clays have particle sizes in the range of 2 microns. The finer the particle size, the better the filler responds in giving an improved vulcanizate. It is not critical whether these kaolin clays are "residual" or "sedimentary" in origin; they can be produced by any conventional process such as the dry process (air flotation) or the web process (classification in a water suspension). These clays are the clay minerals belonging to the kaolin group and have a stable non-expanding crystal lattice in which one gibbsite sheet is condensed with one silica sheet. Representative minerals include kaolinite, the most important one, nacrite, dickite, and halloysite. Kaolinite has the chemical formula $Al_2O_3 \cdot 2SiO_2 \cdot 2H_2O$. It is to be understood that these kaolins generally also contain some compounds of iron, titanium, calcium, magnesium, potassium, sodium, and occasionally manganese; in kaolinites minor proportions of hydrated aluminum silicate minerals other than kaolinite may be present. In general, the molar ratio of silica to alumina in the clay is in the neighborhood of 2:1, the value of kaolinite itself.

The principal physical characteristics of a kaolin clay which are preferred for use in the present invention are:

(1) a specific gravity of about 2.60;
(2) a 325-mesh screen residue below about 3.5% preferably below about 0.35%;
(3) absorbed moisture content not above about 0 to 1%;
(4) a particle size distribution wherein at least about 55% by weight of the particles are two microns or less in diameter; and
(5) a pH (in water) of about 4.4 to 7.0, although specially prepared and treated clays may show pH values of 8.0 or higher.

Representative "hard" and "soft" kaolins contain (by weight): 44 to 46% silica; 37.5 to 39.5% alumina; 0.5 to 2.0% ironoxide; and 1 to 2% titanium dioxide; the ignition loss of these representative clays is 13.9 to 14.0% by weight. Clays are more particularly described in the following publications: Compounding Ingredients for Rubber, third edition, 1961, Cuneo Press of New England, Cambridge, Mass., compiled by the editors of Rubber World, 630 3rd Ave., New York 17, N.Y.; Kaolin Clays and Their Industrial Uses, J. M. Huber Corp., New York, N.Y., second edition, 1955; India Rubber World, vol. 118, No. 6, New York, September 1948, pages 793–795; Clays, Their Occurrence, Properties and Uses, H. Ries, third edition, John Wiley & Sons, Inc., New York, 1927; The Chemistry and Physics of Clays and Other Ceramic Materials, A. B. Searle and R. W. Grimshaw, third edition, Interscience Publishers, Inc., New York, 1959; Preliminary Reports Reference Clay Materials, American Petroleum Institute Research Project 49, Columbia University, New York, January 1951, and X-Ray Identification and Crystal Structures of Clay Materials, edited by G. W. Brindley, London, 1951.

When carbon black is to be used channel and furnace process blacks are preferred. SAF furnace black is an excellent reinforcing agent; other furnace blacks such as SRF, HMF, CF, HAF, and FF are also very satisfactory. Stocks containing channel blacks are slightly slower curing; however, any of them, e.g. EPC, MPC, HPC, CC, can be used. Thermal carbons can be employed but provide a lower order of reinforcement.

About 20 to 300 parts of filler are used per 100 parts of copolymer. When carbon black is used the amounts are frequently from 40 to 80 parts; when kaolin clay is the filler the amounts are frequently in the range of 80 to 120 parts.

(III) *The cure-promoting copolymer*

The ethylene/1,4-hexadiene copolymer which is incorporated as the cure promoter has at least about three gram-moles of carbon-carbon double bonds per kilogram and exhibits an inherent viscosity of at least 0.1 (measured on a 0.1% by weight solution in tetrachloroethylene at 30° C.). Ethylene/1,4-hexadiene copolymers having less than about 3 gram-moles of carbon-carbon double bonds per kilogram display less activity as cure promoters. Higher unsaturation is permissible and desirable, for example up to 6–7 or more gram-moles of carbon-carbon double bonds per kilogram of copolymer. The C=C content is determined as set forth infra.

Eethylene/1,4-hexadiene copolymers and their preparation are generally described in U.S. Patent 2,933,480. They are prepared in solution in inert solvents with coordination catalysts. The preferred catalyst used is prepared by mixing about one molar proportion of vanadium tris(acetylacetonate) with 7.5 molar proportions of diisobutyl aluminum monochloride. Vanadyl chloride and vanadium tetrachloride are alternative vanadium compounds. Representative concentrations of vanadium in the copolymerization reaction zone range from about 0.00005 to 0.005 gram-atom per liter, 0.00005 sometimes being preferred. Some catalysts can be premixed or, frequently, formed in situ in the reaction vessel; others may be more advantageously made by one or more ways. For example VOCl$_3$/(isoBu)$_2$AlCl is preferably premixed. In batch operations, it is frequently preferred to introduce the hexadiene first, then the catalyst, and finally the ethylene.

Representative solvents include halogenated hydrocarbons such as tetrachloroethylene, carbon tetrachloride, methylene chloride, ethyl chloride, and 1,2-dichloroethane; liquid paraffins and cycloparaffins such as pentane, cyclohexane, 2,2,4-trimethylpentane and n-octane; and aromatic hydrocarbons such as benzene, toluene, and mixed xylenes.

Since ethylene is by far the more reactive monomer used in making the ethylene/1,4-hexadiene copolymer, there is a tendency for the copolymer to contain an undesirably high ethylene monomer content; thus it is important to control its concentration in the reaction zone. When the reaction vessel has no free vapor space, i.e., the reaction system is at all times full of liquid, the concentrations of monomers can be controlled merely by supplying the appropriate quantities of the monomers to a given volume of the reaction medium. When the reaction system has a vapor space, the monomer concentrations are controlled by their partial pressures in the vapor space and by the reaction temperature. One can use an inert gaseous diluent such as nitrogen to reduce the partial pressure of ethylene; representative feed streams have 20–50 mole percent ethylene. One reduces the ethylene partial pressure until the desired copolymer composition results.

The operating temperature is an important feature of the process for making the ethylene/1,4-hexadiene copolymer. At temperatures above 75° C., the catalyst activity may be inconveniently short-lived. It is generally inconvenient to operate at temperatures below −30° C. because additional cooling equipment is required; furthermore, at temperatures much below −30° C., the reaction rate is undesirably reduced.

The promoter concentration may be selected empirically to gain optimum results. The value frequently ranges between about 1 phr. and 50 phr., 5 phr. to 35 phr. being preferred. When less than 1 phr. is used, the improvement in cure behavior is sometimes too small to be of practical interest.

(IV) Sulfur curing

In operating the present invention, the cure-promoting copolymer is mixed with the principal elastomer stock at any time before curing begins. The order of addition is not important. Mixing of the components of the curable composition is carried out in the conventional manner using rubber roll mills, Banbury mixers, and the like. In order to avoid premature scorch, it is preferred to mix at temperatures in the range 75 to 100° F., well below the cure temperature.

The compositions of the present invention can be very readily cured with sulfur to give outstanding vulcanizates. Any of the procedures familiar to those skilled in the processing of natural rubber, butadiene/styrene rubber and butyl rubber are suitable. It is preferable to use a combination of sulfur, a metal oxide, and a vulcanization accelerator. In general, about 0.2 to 3.5 parts of sulfur are used per 100 parts by weight of copolymer; it is to be understood that larger or smaller concentrations may be used when deemed desirable. Although the promoter compound is itself unsaturated, it is unnecessary to supply additional sulfur beyond the requirements customarily used with the principal hydrocarbon polymer stock itself. Thus, if the concentration of the promoter compound is varied from, for example, 5 to 20 parts per 100 parts by weight of polymer, the same amount of sulfur can be supplied for each of the various compositions.

Zinc oxide and cadmium oxide are the preferred oxides; zinc oxide is particularly preferred because it is more efficient, lower in cost, and is less hazardous to use. The concentration of the metal oxide is important since it, in conjunction with sulfur and accelerator, controls the ultimate state of cure. At concentrations of 3 to 10 parts by weight per 100 parts by weight of elastomer, the rate and state of cure are very satisfactory as indicated by modulus, compression set, and elongation. Concentrations above 10 parts are unnecessary. Concentrations below 3 parts are less satisfactory for developing and maintaining adequate vulcanizate properties. The most active accelerators include 2-mercapto-benzothiazole, thiuram sulfides, dithiocarbamates and their simple derivatives. Of the three classes, the thiuram sulfides and dithiocarbamates are generally preferred because they produce rapid curing without attendant scorching and develop and maintain maximum physical properties even on extended curing cycles. For many uses, however, 2-mercapto-benzothiazole and its derivatives, alone or in combination with thiurams or dithiocarbamates provide adequate acceleration with processing safety. Representative accelerators include: tetramethyl thiuram monosulfide; tetramethyl thiuram disulfide; tellurium monosulfide; tetramethyl thiuram disulfide; tellurium diethyldithiocarbamate; the zinc salt of dimethyl dithiocarbamic acid; the piperidine salt of pentamethylene dithiocarbamic acid; 2-mercaptothiazoline; 2-mercaptothiazole; N,N - diethyl-thiocarbamyl-2-mercaptobenzothiazole; and 2,2'-dithiobis benzothiazole.

It is to be understood that the compositions of the present invention can be vulcanized by the use of sulfur-bearing compounds which make the sulfur available under curing conditions. As is well known to those skilled in the art, representative examples of these compounds having bridges containing two or more sulfur atoms, e.g., disulfide groups and tetrasulfide groups. Tetraalkylthiuram disulfides, e.g., tetramethylthiuram disulfide, tetraethyl thiuram disulfide, and dipentamethylene thiuram tetrasulfide, are valuable compounds of this type. Dithiocarbamates, such as selenium dimethyl dithiocarbamate and selenium diethyl dithiocarbamate, and 4,4'-dithiodimorpholine are additional examples of useful compounds. Accrlerators such as tetramethylthiuram monosulfide, can also be present during the cure. The concentration of sulfur-bearing compound will be determined by empirical experiments for a particular application by those skilled in the art. A typical range includes 1 to 6 phr. Further information is given in literature such as the following: Vanderbilt Rubber Handbook, R. T. Vanderbilt Company, 230 Park Avenue, New York, New York, 1958, pages 159, 172–173, 179, 240, 249; Chemistry of Natural and Synthetic Rubbers, H. L. Fisher, Reinhold Publishing Corporation, New York, 1957, pages 30–31; The Applied Science of Rubber, pages 400, 1044–1048; Rubber, Fundamentals of Its Science and Technololgy, page 171; Synthetic Rubber Technology, pages 27–28, 240–241; Bulletin BL–316, Tetrone A, Elastomers Division, E. I. du Pont de Nemours and Co. (Inc.), Wilmington 98, Del.; 1959 Catalogue of Du Pont Elastomers and Chemicals, Elastomer Chemicals Department, E. I. du Pont de Nemours and Co. (Inc.), Wilmington 98, Del., pages 34, 36 and 37.

It is to be understood that various modifications of the sulfur curing procedure may be employed depending upon the stock. Various procedures and modifications of sulfur curing are more particularly described in Encyclopedia of Chemical Technology, Kirk and Othmer, published by Inter-Science Encyclopedia, Inc., New York, 1953, 11, pp. 892–927; Principles of High-Polymer Theory and Practice, Schmidt and Marlies, published by McGraw-Hill Book Co., New York, 1948, pp. 556–566; Chemistry and Technology of Rubber, Davis and Blake, published by Reinhold Publishing Corp., New York, 1937, chapter 6; Introduction to Rubber Technology, edited by M. Morton, Reinhold Publishing Corp., New York, 1959, pp. 93–129; The Applied Science of Rubber, edited by W. J. S. Naunton, Edward Arnold Ltd., London, 1961, pp. 346–413, 992–1099.

Vulcanization is accomplished by heating the compound stock (usually in a mold) at a temperature ranging between 130–200° C. for a period of time ranging from about 2 to 60 minutes; it is often preferred to cure the stock at 160° C. for 2 to 60 minutes. Steam cures can be employed as well. Representative pressures can range from 60 to 225 lb./sq. in. steam and representative times can range from about 30 seconds to 60 minutes. There is no preferred steam cure. High pressure steam is used in wire and cable. Low pressure steam is used for normal extruded goods such as hose, gaskets, etc. The state of cure is best determined by the value of the modulus at 300% extension.

The invention will now be described in and by the following examples of certain specific embodiments wherein parts and percentages are by weight unless otherwise specified.

EXAMPLE I (A) *Principal elastomer.*—The principal elastomer is an ethylene/propylene/1,4-hexadiene copolymer prepared in accordance with the general directions of U.S. Patent 2,933,480 using a diisobutyl aluminum chloride/vanadium oxytrichloride catalyst and tetrachloroethylene solvent. Representative examples of this copolymer have about 40–45% propylene monomer units and 3.5–4.5% 1,4-hexadiene monomer units by weight and exhibit Mooney (ML–4/100° C.) viscosity values of 80–90.

(B) *Cure-promoting copolymer of ethylene/1,4-hexadiene.*—The ethylene/1,4-hexadiene copolymer is prepared continuously at atmospheric pressure in a 3.75-liter reaction vessel. A purified monomer blend supplying 2.5 liters per minute apiece of ethylene and nitrogen (per liter of solution in the reaction vessel) is introduced continuously throughout the reaction. The coordination catalyst is premixed at 25° C. in tetrachloroethylene in the presence of 1 molar 1,4-hexadiene monomer. After a residence time of about 1 minute the catalyst/diene steam is introduced into the agitated reactor. In the reaction vessel the vanadium concentration is 0.001 molar, the aluminum concentration is 0.086 molar, the 1,4-hexadiene concentration is 1.0 molar, the temperature is 0° C., the pressure is atmospheric, and the residence time is 25 minutes. The reactor effluent, containing 32 grams of copolymer per liter, is treated once with an equal volume of 0.5 percent by weight sulfuric acid, and three times with equal volumes of water. After 0.5 percent 4,4'-thiobis(2-tertiary-butyl-5-methylphenol) antioxidant (by weight of copolymer) have been added to the solution, the tetrachloroethylene solvent is removed on a drum dryer. The copolymer obtained has a density of 0.89 gram/cc., a Mooney viscosity (ML–4/100° C.) of 24, an inherent viscosity of 1.30 (measured on a 0.1 percent by weight solution in tetrachloroethylene at 30° C.) and contains about 3 gram-mole carbon-to-carbon double bonds/kilogram.

(C) *Preparation of black-loaded vulcanizates.*—Two stocks, A and B, were compounded on a rubber roll mill according to the following general recipe:

| Component: | Parts by weight |
|---|---|
| Principal elastomer of Part A above.[1] | |
| Ethylene/1,4-hexadiene copolymer.[1] | |
| Stearic acid | 1 |
| Zinc oxide | 5 |
| HAF black | 80 |
| Naphthenic petroleum oil | 40 |
| Sulfur | 1.5 |
| Tetramethyl thiuram disulfide | 1.5 |
| 2-mercaptobenzothiazole | 0.5 |

[1] See Table I(A).

Stock 1B, which is outside the scope of the present invention, was tested for purposes of comparison.

Portions of Stocks 1A and 1B were cured at 320° F. for 2, 5, 10, 20, and 30-minute periods. Other portions were cured at 307° F. for 5, 10, 30, and 60-minute periods. The data obtained for the resulting vulcanizate at 25° C. are given in the following table:

TABLE I(A)

| | Stock 1A | Stock 1B (control) |
|---|---|---|
| Principal elastomer | 80 | 100 |
| Ethylene/1,4-hexadiene copolymer | 20 | 0 |
| Cure: 2'/320° F.: | | |
| 300% Modulus | 1,175 | 150 |
| Tensile Strength | 2,250 | 1,350 |
| Elongation at Break | 730 | 1,120 |
| Cure: 5'/320° F.: | | |
| 300% Modulus | 1,450 | 500 |
| Tensile Strength | 2,600 | 2,600 |
| Elongation at Break | 520 | 750 |
| Cure: 10'/320° F.: | | |
| 300% Modulus | 1,975 | 1,000 |
| Tensile Strength | 2,450 | 2,400 |
| Elongation at Break | 380 | 520 |
| Cure: 20'/320° F.: | | |
| 300% Modulus | 2,200 | 1,400 |
| Tensile Strength | 2,400 | 2,500 |
| Elongation at Break | 330 | 450 |
| Cure: 30'/320° F.: | | |
| 300% Modulus | 2,250 | 1,700 |
| Tensile Strength | 2,250 | 2,550 |
| Elongation at Break | 300 | 410 |
| Cure: 5'/307° F.: | | |
| 300% Modulus | 1,100 | 310 |
| Tensile Strength | 2,500 | 2 |
| Elongation at Break | 620 | 930 |
| Cure: 10'/307° F.: | | |
| 300% Modulus | 1,800 | 800 |
| Tensile Strength | 2,550 | 2,750 |
| Elongation at Break | 440 | 650 |
| Cure: 30'/307° F.: | | |
| 300% Modulus | 2,200 | 1,450 |
| Tensile Strength | 2,300 | 2,550 |
| Elongation at Break | 310 | 440 |
| Cure: 60'/307° F.: | | |
| 300% Modulus | | 1,700 |
| Tensile Strength | 2,100 | 2,600 |
| Elongation at Break | 260 | 400 |

(D) *Preparation of clay loaded vulcanizates.*—Two stocks, 1C and 1D, were compounded on a rubber roll mill at 75 to 100° F. according to the following recipe:

| Component: | Parts by weight |
|---|---|
| Principal elastomer.[1] | |
| Ethylene/1,4-hexadiene copolymer.[1] | |
| Stearic acid | 1 |
| Zinc oxide | 5 |
| Kaolin clay | 120 |
| Naphthenic petroleum oil | 40 |
| Sulfur | 2.5 |
| Zinc dimethyldithiocarbamate | 2.5 |
| 2-mercaptobenzothiazole | 0.5 |

[1] See Table I(B).

Stock 1D, which was outside the scope of the present invention, was prepared for purposes of comparison.

Stocks 1C and 1D were then cured at 320 and 307° F. for periods of time including 2, 5, 10, 20, 30 and 60 minutes. The table which follows gives the properties of the resulting vulcanizates as measured at 25° C.

TABLE I(B)

|  | Stock 1C | Stock 1D (control) |
|---|---|---|
| Principal elastomer | 80 | 100 |
| Ethylene/1,4-hexadiene copolymer | 20 | 0 |
| Cure: 2'/320° F.: |  |  |
| 300% Modulus | 320 | 150 |
| Tensile Strength | 1,425 | 875 |
| Elongation at Break | 810 | 1,090 |
| Cure: 5'/320° F.: |  |  |
| 300% Modulus | 550 | 225 |
| Tensile Strength | 1,425 | 1,300 |
| Elongation at Break | 600 | 890 |
| Cure: 10'/320° F.: |  |  |
| 300% Modulus | 650 | 280 |
| Tensile Strength | 1,425 | 1,375 |
| Elongation at Break | 550 | 780 |
| Cure: 20'/320° F.: |  |  |
| 300% Modulus | 850 | 375 |
| Tensile Strength | 1,300 | 1,500 |
| Elongation at Break | 440 | 720 |
| Cure: 30'/320° F.: |  |  |
| 300% Modulus | 875 | 430 |
| Tensile Strength | 1,450 | 1,100 |
| Elongation at Break | 450 | 610 |
| Cure: 5'/307° F.: |  |  |
| 300% Modulus | 375 | 200 |
| Tensile Strength | 1,400 | 1,075 |
| Elongation at Break | 760 | 1,040 |
| Cure: 10'/307° F.: |  |  |
| 300% Modulus | 600 | 220 |
| Tensile Strength | 1,550 | 1,425 |
| Elongation at Break | 590 | 860 |
| Cure: 30'/307° F.: |  |  |
| 300% Modulus | 800 | 310 |
| Tensile Strength | 1,550 | 1,700 |
| Elongation at Break | 500 | 730 |
| Cure: 60'/370° F.: |  |  |
| 300% Modulus | 925 | 390 |
| Tensile Strength | 1,300 | 1,300 |
| Elongation at Break | 400 | 640 |

In this example, a black-loaded stock containing the promoter attained a 300% modulus of 1175 p.s.i. and a tensile strength of 2250 p.s.i. after a 2-minute cure at 320° F., whereas, the black-loaded control without promoter had a 300% modulus of only 150 p.s.i. and a tensile strength of only 1350 p.s.i. after a similar cure time at 320° F. A black-loaded stock containing promoter attained vulcanizate properties after only a 10-minute cure at 307° F. similar to those of the black-loaded control in a 60-minute cure at 307° F.

EXAMPLE II (A) *Preparation of black-loaded vulcanizates.*—Six stocks, 2A–2F, were compounded on a rubber roll mill according to the following recipe:

Component:                          Parts by weight
    Principal elastomer of Ex. I.[1]
    Ethylene/1,4-hexadiene copolymer of Ex. I.[1]
    Stearic acid _____ 1
    Zinc oxide _____ 5
    HAF black _____ 80
    Naphthenic petroleum oil _____ 40
    Sulfur.[1]
    Tetramethyl thiuram disulfide.[1]
    2-mercaptobenzothiazole _____ 0.5

[1] See Table II(A).

The stocks were cured in a press for 30 minutes at 320° F. The properties of the resulting vulcanizates as measured at 25° C. are given in the table which follows:

TABLE II(A)

|  | Stocks | | | | | |
|---|---|---|---|---|---|---|
|  | 2A | 2B | 2C | 2D | 2E | 2F |
| Principal elastomer | 100 | 95 | 85 | 75 | 65 | 50 |
| Ethylene/1,4-hexadiene copolymer | 0 | 5 | 15 | 25 | 35 | 50 |
| Sulfur | 1.5 | 1.47 | 1.4 | 1.33 | 1.26 | 1.15 |
| Tetramethyl thiuram disulfide | 1.5 | 1.48 | 1.42 | 1.36 | 1.3 | 1.2 |
| Property: |  |  |  |  |  |  |
| 100% Modulus | 350 | 475 | 700 | 900 | 850 | 850 |
| 200% Modulus | 1,000 | 1,100 | 1,500 | 1,800 | 1,800 | 1,900 |
| 300% Modulus | 1,850 | 2,000 | 2,250 |  |  |  |
| Tensile Strength | 2,600 | 2,700 | 2,400 | 2,100 | 2,100 | 2,000 |
| Elongation at Break | 400 | 390 | 320 | 240 | 220 | 220 |

(B) *Preparation of clay loaded vulcanizates.*—Six stocks, 2H–2M, were compounded on a rubber roll mill according to the following recipe:

Component:                          Parts by weight
    Principal elastomer of Ex. I _____ 100
    Stearic acid _____ 1
    Zinc oxide _____ 5
    Kaolin clay _____ 120
    Napthenic petroleum oil _____ 40
    Sulfur.[1]
    Zinc dimethyldithiocarbamate.[1]
    2-mercaptobenzothiazole _____ 0.5

[1] See Table II(B).

The stocks thus prepared were cured in a press for 30 minutes at 320° F. Stock 2H is outside the present invention and is listed for comparison only. The table which follows gives the properties of the resulting vulcanizates as measured at 25° C.

TABLE II(B)

|  | Stocks | | | | | |
|---|---|---|---|---|---|---|
|  | 2H | 2I | 2J | 2K | 2L | 2M |
| Principal elastomer | 100 | 95 | 85 | 75 | 65 | 50 |
| Ethylene/1,4-hexadiene | 0 | 5 | 15 | 25 | 35 | 50 |
| Sulfur | 2.5 | 2.43 | 2.27 | 2.13 | 1.93 | 1.75 |
| Zinc dimethyl dithiocarbomate | 2.5 | 2.5 | 2.45 | 2.43 | 2.4 | 2.35 |
| Properties: |  |  |  |  |  |  |
| 100% Modulus | 175 | 250 | 275 | 300 | 350 | 350 |
| 200% Modulus | 300 | 400 | 500 | 550 | 575 | 550 |
| 300% Modulus | 375 | 550 | 700 | 750 | 800 | 775 |
| Tensile Strength | 1,400 | 1,600 | 1,400 | 1,225 | 1,100 | 1,150 |
| Elongation at Break | 690 | 640 | 540 | 460 | 390 | 420 |

EXAMPLE III (A) *Preparation of black-loaded vulcanizates.*—Three stocks, 3A–3C, were compounded on a rubber roll mill according to the recipe given in Part C of Example I above except as noted. Stock 3C which was outside the present invention was prepared for purposes of comparison and contained only the principal elastomer. The stocks were cured for 2, 5, 10, 20 and 30-minute periods at 320° F. The properties of the resulting vulcanizates, measured at 25° C., are given in the table which follows:

TABLE III(A)

|  | Stock 3A | Stock 3B | Stock 3C |
|---|---|---|---|
| Principal elastomer of Ex. I | 90 | 50 | 100 |
| Ethylene/1,4-hexadiene copolymer of Ex. I | 10 | 50 | 0 |
| Cure: 2'/320° F.: |  |  |  |
| 300% Modulus | 325 | 1,050 | 100 |
| Tensile Strength | 1,100 | 1,650 | 700 |
| Elongation at Break | 840 | 500 | 1,200 |
| Cure: 5'/320° F.: |  |  |  |
| 300% Modulus | 1,000 |  | 400 |
| Tensile Strength | 2,150 | 1,850 | 2,400 |
| Elongation at Break | 550 | 260 | 870 |
| Cure: 10'/320° F.: |  |  |  |
| 300% Modulus | 1,400 |  | 800 |
| Tensile Strength | 2,150 | 1,700 | 2,700 |
| Elongation at Break | 410 | 200 | 640 |
| Cure: 20'/320°F.: |  |  |  |
| 300% Modulus | 1,800 |  | 1,325 |
| Tensile Strength | 2,000 | 1,500 | 2,600 |
| Elongation at Break | 320 | 160 | 460 |
| Cure: 30'/320° F.: |  |  |  |
| 300% Modulus | 1,900 |  | 1,600 |
| Tensile Strength | 2,000 | 1,600 | 2,700 |
| Elongation at Break | 320 | 160 | 044 |

(B) *Preparation of clay loaded vulcanizates.*—Three stocks, 3D–3F, were compounded on a rubber roll mill at 75–100° F. according to the recipe of Part D of Example I except as noted. Stock 3F, which was outside the scope of the present invention, was prepared for purposes of comparison.

The stocks were then cured for 2, 5, 10, 20 and 30- minute periods at 320° F. The properties of the resulting vulcanizates, measured at 25° C., were as follows:

TABLE III(B)

| | Stock 3D | Stock 3E | Stock 3F |
|---|---|---|---|
| Principal elastomer of Ex. I | 90 | 50 | 100 |
| Ethylene/1,4-hexadiene copolymer of Ex. I | 10 | 50 | 0 |
| Cure: 2'/320° F.: | | | |
| 300% Modulus | 200 | 500 | 75 |
| Tensile Strength | 1,100 | 1,550 | 600 |
| Elongation at Break | 1,060 | 640 | >1,200 |
| Cure: 5'/320° F.: | | | |
| 300% Modulus | 350 | 700 | 140 |
| Tensile Strength | 1,425 | 1,350 | 1,100 |
| Elongation at Break | 840 | 460 | 980 |
| Cure: 10'/320° F.: | | | |
| 300% Modulus | 500 | 900 | 200 |
| Tensile Strength | 1,700 | 1,300 | 1,400 |
| Elongation at Break | 730 | 400 | 880 |
| Cure: 20'/320° F.: | | | |
| 300% Modulus | 675 | 1,075 | 300 |
| Tensile Strength | 1,550 | 1,250 | 1,900 |
| Elongation at Break | 600 | 330 | 780 |
| Cure: 30'/320° F.: | | | |
| 300% Modulus | 675 | 1,125 | 350 |
| Tensile Strength | 1,300 | 1,200 | 1,700 |
| Elongation at Break | 550 | 320 | 720 |

In this example, a clay-loaded stock containing promoter attained at 300% modulus of 350 p.s.i. and a tensile strength of 1425 p.s.i. after a 5-minute cure at 320° F., whereas the clay-loaded control had a 300% modulus of only 140 p.s.i. and a tensile strength of only 1100 after a similar cure time at 320° F. A clay-loaded stock in a 10-minute cure at 320° F. attained vulcanizate properties even better than those of the clay-loaded control after a 30-minute cure at 320° F.

EXAMPLE IV (A) *Principal elastomers.*—Two butyl-type elastomers are employed in this example; these are identified as follows:

Butyl 035: This copolymer has the following monomer unit composition: isobutylene, 99–99.4 mole percent; isoprene, 0.6–1.0 mole percent; Mooney viscosity (ML at 100° C., 8 minutes), 41–49.

Butyl 325: This copolymer has the following monomer unit composition: isobutylene, 97.7–98.1 mole percent; isoprene, 1.9–2.3 mole percent. The Mooney viscosity (ML at 100° C., 8 minutes), 41–49.

(B) *Preparation of black-loaded butyl vulcanizates.*— Eight stocks (4A–4H) were compounded on a rubber roll mill according to the following recipe. Stocks 4D and 4H, which were outside the scope of the present invention, were prepared for purposes of comparison.

| Component: | Parts by weight |
|---|---|
| Butyl 035.[1] | |
| Butyl 325.[1] | |
| Ethylene/1,4-hexadiene copolymer.[1] | |
| Stearic acid | 2 |
| Zinc oxide | 5 |
| HAF black | 50 |
| Naphthenic petroleum oil | 5 |
| Sulfur | 1.5 |
| Tetramethyl thiuram disulfide | 1.5 |
| 2-mercaptobenzothiazole | 0.5 |

[1] See Tables IV (A and B).

Stocks 4A–4H were cured for 2, 5, 10, 20, and 30-minute periods at 320° F. The properties of the vulcanizates, measured at 25° C., are given in the table which follows:

TABLE IV(A)

| | Stocks | | | |
|---|---|---|---|---|
| | 4A | 4B | 4C | 4D |
| Butyl 035 | 90 | 70 | 50 | 100 |
| Ethylene/1,4-hexadiene | 10 | 30 | 50 | 0 |
| Cure: 2'/320° F.: | | | | |
| 200% Modulus | 350 | 800 | 1,310 | 75 |
| Tensile Strength | 1,300 | 1,125 | 1,650 | 750 |
| Elongation at Break | 790 | 390 | 270 | 1,140 |
| Cure: 5'/320° F.: | | | | |
| 200% Modulus | 575 | 1,125 | | 180 |
| Tensile Strength | 1,900 | 1,375 | 1,800 | 2,000 |
| Elongation at Break | 600 | 280 | 200 | 960 |
| Cure: 10'/320° F.: | | | | |
| 200% Modulus | 780 | 1,280 | | 290 |
| Tensile Strength | 1,900 | 1,350 | 1,800 | 2,300 |
| Elongation at Break | 490 | 240 | 160 | 770 |
| Cure: 20'/320° F.: | | | | |
| 200% Modulus | 850 | | | 400 |
| Tensile Strength | 1,850 | 1,300 | 1,700 | 2,300 |
| Elongation at Break | 460 | 200 | 130 | 700 |
| Cure: 30'/320° F.: | | | | |
| 200% Modulus | 875 | | | 470 |
| Tensile Strength | 1,800 | 1,300 | 1,800 | 2,400 |
| Elongation at Break | 430 | 190 | 130 | 660 |

TABLE IV(B)

| | Stocks | | | |
|---|---|---|---|---|
| | 4E | 4F | 4G | 4H |
| Butyl 325 | 90 | 70 | 50 | 100 |
| Ethylene/1,4-hexadiene | 10 | 30 | 50 | 0 |
| Cure: 2'/320° F.: | | | | |
| 200% Modulus | 550 | 1,000 | 1,325 | 250 |
| Tensile Strength | 2,000 | 1,800 | 2,000 | 1,900 |
| Elongation at Break | 670 | 400 | 310 | 860 |
| Cure: 5'/320° F.: | | | | |
| 200% Modulus | 875 | 1,400 | 1,900 | 410 |
| Tensile Strength | 2,250 | 1,950 | 1,950 | 2,300 |
| Elongation at Break | 520 | 310 | 210 | 750 |
| Cure: 10'/320° F.: | | | | |
| 200% Modulus | 1,125 | 1,650 | | 620 |
| Tensile Strength | 2,200 | 1,750 | 1,800 | 2,250 |
| Elongation at Break | 400 | 210 | 160 | 550 |
| Cure: 20'/320° F.: | | | | |
| 200% Modulus | 1,250 | | | 850 |
| Tensile Strength | 2,100 | 1,800 | 1,900 | 2,000 |
| Elongation at Break | 340 | 190 | 140 | 400 |
| Cure: 30'/320° F.: | | | | |
| 200% Modulus | 1,300 | | | 950 |
| Tensile Strength | 2,000 | 1,700 | 1,900 | 2,100 |
| Elongation at Break | 320 | 180 | 130 | 380 |

In this example, a black-loaded butyl stock of the present invention, cured at 320° F. for only 5 minutes, gave a vulcanizate better than a conventional black-loaded butyl stock after a 20-minute cure at 320° F.

*Determination of carbon-to-carbon unsaturation*

In the above examples, carbon-to-carbon unsaturation is determined as follows: Twenty-five milliliters of a solution of 5 ml. bromine in one liter of $CCl_4$ is added to a solution of copolymer in 50 ml. of $CCl_4$ at 25° C. The flask is stoppered, covered with a few ml. of 25% aqueous KI, and placed in the dark for two hours at 25° C. Then, the KI solution and about 25 ml. of additional 25% aqueous KI are introduced. The resulting mixture is titrated to a starch end point with 0.1 N sodium thiosulfate. (If it appears that emulsification of the solvent will obscure the end point, 75 ml. of 10% aqueous NaCl are added during the titration.) Then, 5 ml. of aqueous $KIO_3$ (made by dissolving 25 grams $KIO_3$ in one liter of water) are added, and the mixture is again titrated with 0.1 N sodium thiosulfate. A blank is run by repeating the above procedure without the copolymer.

The C=C concentration is determined by subtracting the bromine consumed by substitution in the copolymer from the total bromine consumed by reaction with the copolymer.

The total bromine (moles/kg.) =

$$\frac{(B-T)\ 0.1}{2\ (\text{grams of copolymer})}$$

where $B$ = ml. 0.1 N sodium thiosulfate used to 1st end point (before $KIO_3$ addition) of blank solution $T$ = ml. 0.1 N sodium thiosulfate used to 1st end point (before $KIO_3$ addition) of copolymer solution The bromine consumed by substituted (moles/kg.) =

$$\frac{[(M-H)]\ 0.1}{(\text{Grams of copolymer})}$$

where $M$ = ml. 0.1 sodium thiosulfate added after $KIO_3$ solution introduced into copolymer solution $H$ = ml. 0.1 sodium thiosulfate added after $KIO_3$ solution introduced into blank solution

Determination of iodine number

The iodine number, as used herein, is determined by Wijs method at 25° C. A modified Wijs reagent is prepared by adding 2.5 ml. of iodine monochloride and 2 small iodine crystals to 500 ml. of chloroform (or carbon tetrachloride). A 25-ml. sample of this reagent is added to a flask containing 25 ml. of a solution of polymer in chloroform (or carbon tetrachloride). The resulting mixture is allowed to stand in the dark for 120 minutes. The flask is then removed, 2 grams of potassium iodide are added, and the resulting mixture is titrated with 0.1 N sodium thiosulfate. After a color change from purple-black to light brown (or yellow) occurs, 2 ml. of starch solution are added; titration is continued until the mixture is clear. A blank is determined by following the above procedure without a polymer sample. The iodine number, defined as the grams of iodine consumed by 100 grams of polymer, is calculated as $$\frac{\text{ml. of thiosulfate (blank-sample)} \times 0.1 \times 12.69)}{\text{grams of polymer}}$$

In the foregoing examples vulcanizate properties are measured in accordance with the following procedures:

| Property | ASTM method |
|---|---|
| Stress-strain | D412–61 T |
| Mooney viscosity | D1646–61 |
| Compression set | D395–55, Method B |

The compositions of the present invention, containing the cure-promoting ethylene/1,4-hexadiene copolymer, cure much more rapidly than do similar compositions in which it is absent. An idea of the extraordinary difference can be gained from the comparative data in the above examples.

The compositions of the present invention cure so rapidly that heat treatment is not needed. Comparable moduli at 300% extension are attained under equal curing conditions.

The α-olefin compositions of the present invention possess excellent ozone resistance and weatherability (that is, freedom from cracking and crazing) which makes them especially suitable for black stock applications such as hose, windshield blades and the like. The oil extended α-olefin compositions are characterized by exceptionally improved processing behaviour which makes them very easy to calender and extrude. The α-olefin compositions loaded with clay can be employed in the preparation of shoe soles and heels and a wide variety of molded articles. The uncured but compounded compositions are not affected by moisture and can be stored for lengthy periods before shaping and vulcanization.

The improved butyl-type stocks are useful in making inner tubes, tires, fabric impregnation and coating, air bags, cements, adhesives and materials for electrical applications.

As many widely different embodiments of this invention may be made without departing from the spirit and scope thereof, is to be understood that this invention is not limited to specific embodiments thereof except as defined in the appended claims, and all changes which come within the meaning and range of equivalence are intended to be embraced therein.

What is claimed is:

1. A sulfur-curable, filler-loaded elastomeric composition comprising (I) a normally solid elastomeric copolymer selected from the group consisting of (a) a copolymer of ethylene, propylene and at least one nonconjugated hydrocarbon diene of from 5 to 22 carbon atoms, said copolymer having up to about 2 gram-moles of carbon-to-carbon double bonds per kilogram, and (b) a copolymer of an isoolefin and a conjugated diolefin, said isoolefin and diolefin having from 4 to 14 carbon atoms, and said copolymer having an iodine number of from 1 to about 50; (II) from about 20 to 300 parts of a filler compound per 100 parts of copolymer (I), and (III) at least 1 part, per 100 parts of copolymer (I), of a cure-promoting copolymer of ethylene and 1,4-hexadiene having from about 3 to 10 gram-moles of carbon-to-carbon double bonds per kilogram and displaying an inherent viscosity (measured on a 0.1% by weight solution in tetrachloroethylene at 30° C.) of at least 0.1.

2. A composition as defined in claim 1 wherein said copolymer (a) is a copolymer containing from about 30 to 70 weight percent ethylene units, about 30 to 70 weight percent propylene units and up to 10 weight percent 1,4-hexadiene units.

3. A composition as defined in claim 1 wherein said copolymer (b) is a copolymer of at least 95 weight percent isobutylene and from about 0.5 to 5 weight percent of a conjugated diolefin having from 4 to 8 carbon atoms.

4. A composition as defined in claim 1 wherein cure-promoting copolymer (III) is present in amounts ranging from about 5 to 35 parts, per 100 parts of copolymer (I).

5. A composition as defined in claim 1 wherein said filler compound is kaolin clay.

6. A composition as defined in claim 1 wherein said filler compound is carbon black.

7. A sulfur-cured, filler-loaded elastomeric vulcanizate comprising the following components subjected to curing conditions: (I) a normally solid elastomeric copolymer selected from the group consisting of (a) a copolymer of ethylene, propylene and at least one nonconjugated hydrocarbon diene of from 5 to 22 carbon atoms, said copolymer having up to about 2 gram-moles of carbon-to-carbon double bonds per kilogram, and (b) a copolymer of an isoolefin and a conjugated diolefin, said isoolefin and diolefin having from 4 to 14 carbon atoms, and said copolymer having an iodine number of from 1 to about 50; (II) from about 20 to 300 parts of a filler compound per 100 parts of copolymer (I), (III) at least 1 part, per 100 parts of copolymer (I), of a cure-promoting copolymer of ethylene and 1,4-hexadiene having from about 3 to 10 gram-moles of carbon-to-carbon double bonds per kilogram and displaying an inherent viscosity (measured on a 0.1% by weight solution in tetrachloroethylene at 30° C.) of at least 0.1; and (IV) a sulfur-curing system.

8. A vulcanizate as defined in claim 7 wherein said copolymer (a) is a copolymer containing from about 30 to 70 weight percent ethylene units, about 30 to 70 weight percent propylene units and up to 10 weight percent 1,4-hexadiene units.

9. A vulcanizate as defined in claim 7 wherein said copolymer (b) is a copolymer of at least 95 weight percent isobutylene and from about 0.5 to 5 weight percent of a conjugated diolefin having from 4 to 8 carbon atoms.

10. A vulcanizate as defined in claim 7 wherein cure-promoting copolymer is present in amounts ranging from about 5 to 35 parts per 100 parts of copolymer (I).

11. A vulcanizate as defined in claim 9 wherein said filler compound is kaolin clay.

12. A vulcanizate as defined in claim 9 wherein said filler compound is carbon black.

References Cited

UNITED STATES PATENTS

| | | | |
|---|---|---|---|
| 3,136,739 | 6/1964 | Adamek et al. | 260—889 |
| 3,200,174 | 8/1965 | Adamek et al. | 260—889 |
| 3,224,985 | 12/1965 | Gladding et al. | 260—889 |

MORRIS LIEBMAN, *Primary Examiner.*

JULIUS FROME, *Examiner.*

J. H. DERRINGTON, *Assistant Examiner.*

UNITED STATES PATENT OFFICE
CERTIFICATE OF CORRECTION

Patent No. 3,365,418                      January 23, 1968

Jack Leland Nyce et al.

It is hereby certified that error appears in the above numbered patent requiring correction and that the said Letters Patent should read as corrected below.

Column 8, TABLE I (A), third column, line 19 thereof, for "2" read -- 2300 --; column 10, TABLE III (A), fourth column, line 17 thereof, for "044" read -- 440 --; column 13, line 39, for "12.69)" read -- 12.69 --.

Signed and sealed this 6th day of May 1969.

(SEAL)
Attest:

Edward M. Fletcher, Jr.

Attesting Officer

Commissioner of Patents